US012071184B2

(12) United States Patent
Wager

(10) Patent No.: US 12,071,184 B2

(45) Date of Patent: Aug. 27, 2024

(54) WHEELED VEHICLE HAVING RETRACTABLE DRIVEN TRACKS

(71) Applicant: Gebhard Charles Wager, Kelowna (CA)

(72) Inventor: Gebhard Charles Wager, Kelowna (CA)

( * ) Notice: Subject to any disclaimer, the term of this patent is extended or adjusted under 35 U.S.C. 154(b) by 564 days.

(21) Appl. No.: 17/217,783

(22) Filed: Mar. 30, 2021

(65) Prior Publication Data

US 2021/0300487 A1 Sep. 30, 2021

Related U.S. Application Data

(60) Provisional application No. 63/002,831, filed on Mar. 31, 2020.

(30) Foreign Application Priority Data

Mar. 31, 2020 (CA) ................................ CA 3077569

(51) Int. Cl.

*B62D 55/084* (2006.01)
*B62D 55/10* (2006.01)
*B62D 55/104* (2006.01)

(52) U.S. Cl.

CPC ........... *B62D 55/084* (2013.01); *B62D 55/10* (2013.01); *B62D 55/104* (2013.01)

(58) Field of Classification Search

CPC ...... B62D 55/084; B62D 55/08; B62D 55/02; B62D 55/04; B62D 55/065; B62D 55/10; B62D 55/104; B62D 55/112; B62D 55/26; B62D 55/28; B62D 55/283; B62D 55/286; B62D 49/0635

See application file for complete search history.

(56) References Cited

U.S. PATENT DOCUMENTS 1,355,853 A * 10/1920 Habsburg-Lothringen ................ B62D 55/02 180/6.54
1,358,575 A * 11/1920 Rimailho ............... B62D 55/02 180/9.34
1,376,648 A * 5/1921 Schneider ............. B62D 55/02 180/9.1
1,443,963 A * 2/1923 Monsen ................ B62D 55/02 305/126
1,550,982 A * 8/1925 Phillips .................. B62D 55/02 180/9.62

(Continued)

FOREIGN PATENT DOCUMENTS

DE 102016118619 A1 * 4/2018 ............ B62D 55/02

*Primary Examiner* — Jacob D Knutson
*Assistant Examiner* — Abigail R Hymel
(74) *Attorney, Agent, or Firm* — Antony C. Edwards

(57) ABSTRACT

A retractable driven track system for wheeled vehicles includes a frame on which is mounted an endless flexible track, a pivotable linkage coupled at a lower end thereof to the frame, and adapted for coupling at an upper end thereof to the underside of a vehicle, a selectively actuable actuator operatively coupled to the frame or linkage to selectively raise and lower the track relative to the vehicle when the track is mounted to the vehicle, a drive selectively driving rotation of the track relative to the frame so as to assist in at least forward traction of the vehicle when the track is driven by the drive and the track is lowered into contact with soft ground under the vehicle.

10 Claims, 2 Drawing Sheets

10 B 12 18b A 18 18a 26a 26a D 32 26b 26 34 30 30a 20 C 14 E 28 20 24a 22 F 20 24 24 C 30 16 20 24b 12

(56) References Cited

U.S. PATENT DOCUMENTS

| | | | | | |
|---|---|---|---|---|---|
| 1,729,374 | A * | 9/1929 | Ehrhart | B62D 55/02 | 180/9.28 |
| 1,953,051 | A * | 3/1934 | Linn | B62D 63/06 | 280/80.1 |
| 2,051,496 | A * | 8/1936 | Sarrazin | B62D 55/02 | 180/185 |
| 2,341,883 | A * | 2/1944 | Sloan | B62D 55/04 | 180/9.62 |
| 5,287,938 | A * | 2/1994 | Welling | B62D 55/04 | 180/9.34 |
| 8,636,296 | B1 * | 1/2014 | Gilbert | B62D 59/04 | 180/9.26 |
| 9,637,186 | B1 * | 5/2017 | Goldenberg | B62D 55/02 | |
| 2009/0101042 | A1 * | 4/2009 | Foote | B61D 15/00 | 105/215.1 |

* cited by examiner

WHEELED VEHICLE HAVING RETRACTABLE DRIVEN TRACKS

CROSS-REFERENCE TO RELATED APPLICATIONS

This application claims priority to U.S. Provisional Patent Application No. 63/002,831 filed on Mar. 31, 2020 and to Canadian Patent Application No. 3,077,569 filed on Mar. 31, 2020, both entitled "Wheeled Vehicle Having Retractable Driven Tracks", the entirety of which are incorporated herein by reference.

TECHNICAL FIELD

This invention relates generally to wheeled vehicles and in particular to a retractable driven track system which is mountable under such vehicles for use in snow or other soft-terrain conditions.

BACKGROUND

It is known to employ endless tracks on either side of a land vehicle, such as a conventional military tank, for increased traction as compared to wheels having resilient tires when used on soft terrain such as mud and snow. However, tracked vehicles have drawbacks such as damaging the terrain under the tracks when the vehicle is turning for example, thus rendering tracked vehicles generally unsuitable for use on conventional paved roads.

The published application by Gibbs Technologies Limited under Publication No. WO 2007/141515, which published Dec. 13, 2007, discloses an amphibious vehicle having a bow, a stern and land propulsion which may include at least two retractable tracked drives. The tracks are retractable above the water line for marine travel. The tracks may be full length dual tracks or half tracks. Wheels may be provided for land travel, and may be retractable. The tracks may retract vertically, or by rotation about a longitudinal axis. Hydraulic rams used to retract the land propulsion may also provide vehicle suspension.

SUMMARY

The present invention is a retractable driven track system for urging motion of a wheeled vehicle driven over soft terrain. As disclosed herein, in one embodiment, not intended to be limiting, the system includes a frame, a flexible endless track mounted on the frame for rotation of the endless track along an underside of the wheeled vehicle, and a pivotable linkage coupled at a lower end thereof to the frame, and adapted for coupling at an upper end thereof to the underside of the wheeled vehicle. A selectively actuable actuator, adapted to cooperate between the underside of the wheeled vehicle and one of the frame or the linkage, is provided to selectively lower and raise the frame and the endless track relative to the underside of the wheeled vehicle. This allows the track to be selectively engaged and disengaged, respectively, with the soft terrain. A drive is also provided, cooperating with, for selectively driven rotation of, the endless track relative to the frame to urge at least forward motion of the vehicle when the track is driven by the drive and the track is engaged with the soft terrain.

In a preferred embodiment the linkage includes at least one scissor linkage. The selectively actuable actuator, when actuated, expands or contracts, or put another way, extends or retracts, the scissor linkage so as to correspondingly lower and raise the frame. In the illustrated embodiment, the actuator is a pneumatically driven cylinder so that extension of the actuator causes the scissor linkage to extend, and retraction of the actuator causes the scissor linkage to retract. Again, this is not intended to be limiting as other actuators would also work as would be known to one skilled in the art.

As seen in the illustrations, which show a track on a selectively elevatable frame on both sides of a vehicle, the system in one aspect includes a pair of frames and corresponding tracks, linkages, actuators and drives mountable on opposite sides of the vehicle so as to be laterally spaced apart across the underside of the vehicle, wherein each of the tracks, when so mounted, extends longitudinally along the underside of the vehicle.

In the illustrated embodiment, again not intended to be limiting, the vehicle is a four wheeled vehicle having a single wheel in each of the four corners of the vehicle so as to define a longitudinally extending wheelbase between front and rear wheels on each side of the vehicle. The pair of linkages, actuators, frames and tracks are mounted along the wheelbase on each side of the vehicle between corresponding front and rear wheels of the vehicle so that, when lowered to engage the soft terrain, the left-side track is between and aligned with the front and rear wheels on the left side of the vehicle, and the right-side track is between and aligned with the front and rear wheels on the right side of the vehicle. Thus the linkages, actuators, frames and tracks may be characterized as being mounted substantially flush along each corresponding side of the vehicle, and further may be mounted centrally, relative to the longitudinal wheelbase dimension, between the front and rear wheels on each side of the vehicle.

In other embodiments, the track, frame, linkage and actuator pair may be laterally inset from the sides of the vehicle, or may be a single track, frame, linkage and actuator system aligned longitudinally along the longitudinally extending centerline of the vehicle. In yet other embodiments, the vehicle may be a two wheeled trailer, and the linkage, the actuator, the frame and the track are mounted centrally under the trailer, for example either centrally along the length of the trailer, or centrally in the sense of being on the longitudinally extending centerline of the trailer, or both.

In the illustrated embodiments, in a first embodiment the scissor linkage is a single scissor linkage mounted at a first end of the frame, and further comprising at least one cross member, and preferably two cross members, pivotally mounted, at lower ends thereof, at a second end of the frame opposite the first end, and wherein upper ends of the cross members are adapted to pivotally mount to the underside of the vehicle above the first end of the frame, whereby the frame is selectively vertically translatable at both the first and second ends of the frame by corresponding first and second actuators, wherein the second actuator is coupled to the second end of the frame, and adapted for mounting to the underside of the vehicle for the selective vertical translation of the second end of the frame.

In a second exemplary embodiment, not intended to be limiting, instead of using at least one cross member, a pair of the scissor linkages and corresponding first and second actuators are coupled to opposite ends of the frame and adapted for mounting to the underside of the vehicle.

Although the present system has been described above as being a system which is ready, or adapted for, mounting to the underside of the vehicle, it is intended to be within the scope of the present disclosure to include the vehicle per se as part of the system in further embodiments of the system.

DESCRIPTION

Figure 1:
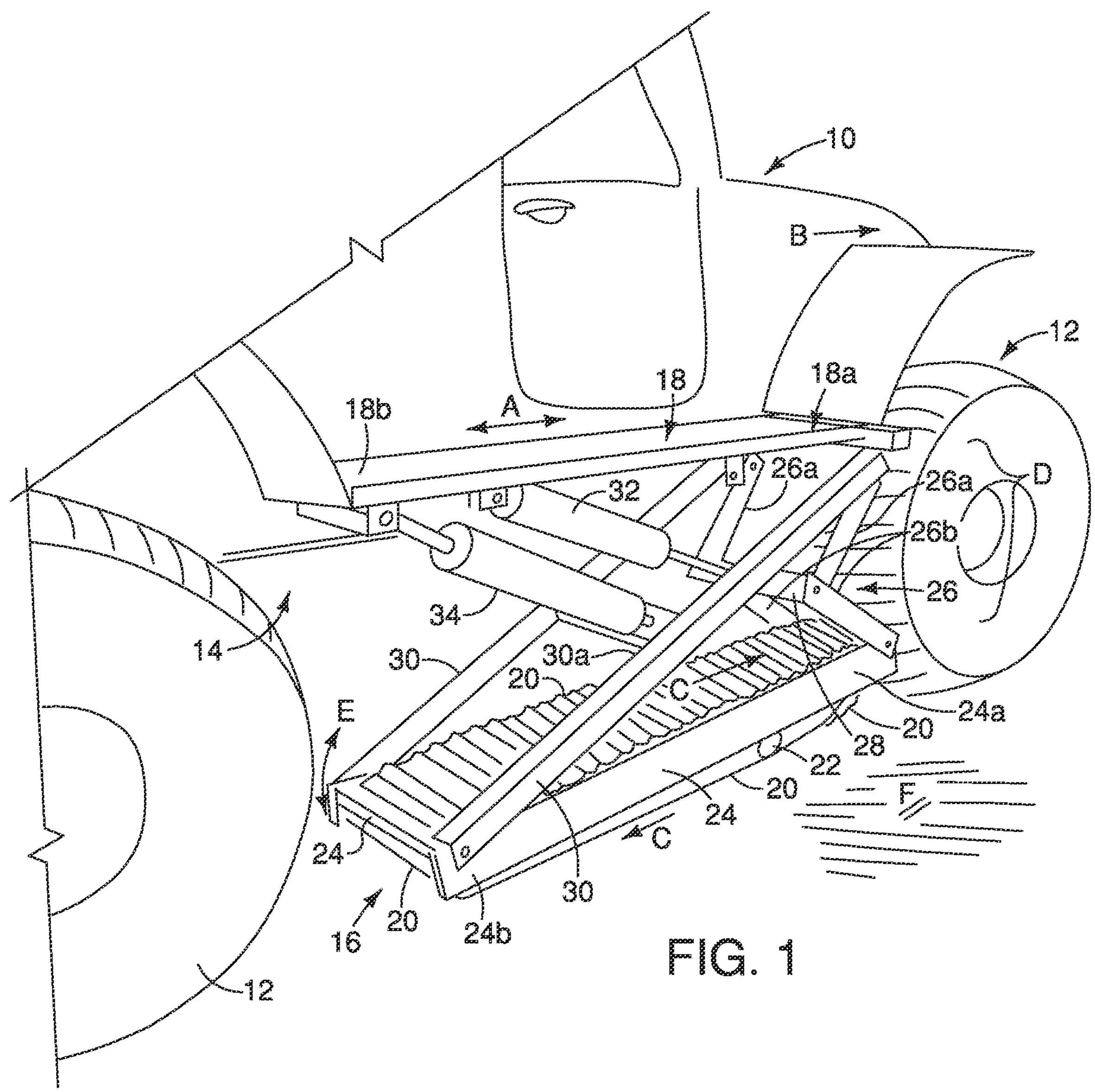
FIG. 1 is, in rear perspective right-side partially cut-away view, a four wheeled vehicle having retractable driven tracks according to one embodiment.

As seen in FIG. 1, a wheeled vehicle 10 includes four wheels 12, two laterally spaced apart at the rear of the vehicle and two having the same lateral spacing at the front of the vehicle. The front and rear wheels are separated by a wheel-base A. In conventional wheeled vehicles 10, all four wheels 12 may be driven wheels, driven by the vehicle's motor via a drive train which typically includes a drive shaft who's position is generally indicated by reference arrow 14.

In deep snow conditions, or in other soft terrain conditions in which wheels 12 may bog down, it assists the wheels' traction in such terrain to reduce the pressure exerted downwardly by the weight of the vehicle acting on the wheels. One way this is accomplished is by using over-size wheels having a large diameter and a large corresponding width so as to increase the wheel footprint on the terrain. For example, and without intending to be limiting, wheels 12 in FIG. 1 may be approximately 44 inches in diameter, thereby reducing their pressure footprint on soft terrain as compared to conventional smaller diameter tires. Another way to reduce the pressure footprint is to reduce the tire pressure in the vehicle tires by deflating the tires when in snow, mud, or otherwise boggy terrain. This again increases the size of the tire's footprint and reduces the pressure per unit area exerted on the ground. This also typically then requires that the tires be re-inflated once clear of the boggy or snowy terrain when it is desired to travel at higher speed.

The addition of retractable tracks 16 mounted under vehicle 10 provides an advantageous method of reducing the pressure footprint of the vehicle acting on the vehicle tires. Although a pair of such tracks 16 mounted for example under the running boards 18 on either side of vehicle 10 do add weight to the vehicle, the benefit in reducing the pressure footprint off-sets the additional weight penalty of the tracks when the tracks 16 are deployed downwardly so as to engage the snow or other soft terrain.

Figure 2:
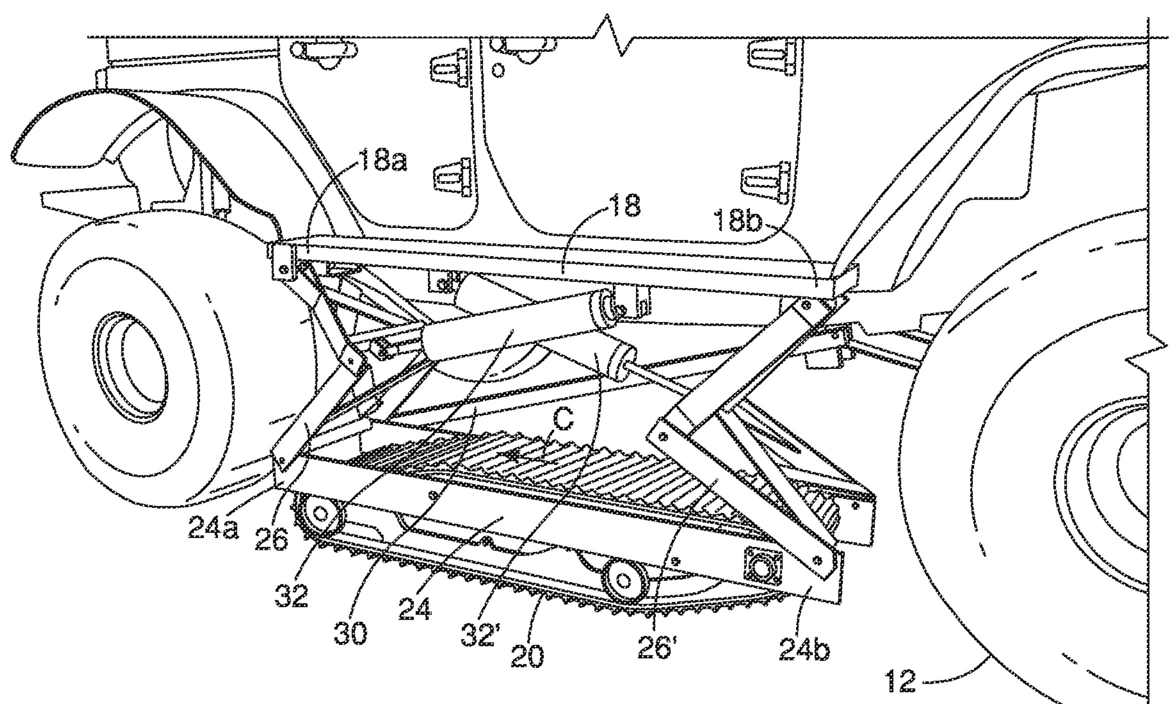
FIG. 2 is, in rear perspective left-side partially cut-away view, a four wheeled vehicle having retractable driven tracks according to a second embodiment.

Although deployment mechanisms other than the actuated linkage illustrated in FIG. 1 will work, such as the alternative actuating linkage shown in FIG. 2, FIG. 1 is provided as an example of a driven track system for selectively raising and lowering a driven endless track 20 so as to raise track 20 up tucked closely under the vehicle for on-road or higher speed travel, and to lower track 20 to engage soft terrain, for example in snow, mud or boggy conditions.

Thus what is seen in FIG. 1 by of example, and without intending to be limiting, is a driven endless track 20, such as may be found on snow-mobiles, supported on bogeys or rollers 22 mounted on a frame 24. Frame 24 is rigid and may, as seen, be rectangular and planar so as to be approximately parallel with a notional ground surface F on which the tires rest. Because vehicle 10 moves forwardly in direction B, the end of frame 24 corresponding with the forward end of vehicle 10 is referred to as the forward end 24*a* of frame 24. The opposite, rearmost end of frame 24 is indicated as rearward end 24*b*.

Frame 24 holds endless track 20 so that the track is free to rotate about the ends of the frame 24*a* and 24*b*, for example in direction C when track 20 is driven to assist in forward motion of vehicle 10. The force to drive the rotation of track 20 comes, in one example, from relatively short laterally extending drive axles (not shown) driven at their in-board end by a conventional drive train splitter (not shown) mounted to the vehicle driveshaft indicated generally by arrow 14. The laterally outer ends of the drive shafts drive rotation of one of the in-board sprockets engaging the track.

Other drive arrangements would also work. For example, each track 20 could be driven by a dedicated electric motor, for example mounted within the orbit of the track, or a pair of tracks 20 could be driven by a single electric motor. The tracks 20 could also be driven by a hybrid arrangement of electric drive and mechanical drive. Alternatively, tracks 20 could be hydraulically driven, with the hydraulic motor located within the orbit of the tracks, for example in the space of a sprocket, and with the hydraulic pump located elsewhere in the vehicle.

In the illustrated example of FIG. 1, again which is not intended to be limiting, as other structures and/or linkages such as seen by way of example in FIG. 2 would also work, a single scissor linkage 26 is located at the forward end 24*a* of frame 24, mounted between forward end 24*a* and the corresponding forward end 18*a* of running board 18. The upper ends of upper links 26*a* are pivotally mounted under forward end 18*a*. The lower ends of lower links 26*b* are pivotally mounted to forward end 24*a* of frame 24. The lower ends of upper links 26*a* are pivotally mounted to the upper ends of lower links 26*b*. Cross-bracing (not shown) may be provided between the pairs of upper links and between the pair of lower links. A rigid cross-member 28 extends laterally between the lower ends of upper links 26*a* where pivotally connected to lower links 26*b*.

In this example, which again is not intended to be limiting, a pair of parallel rigid struts 30 extend between, and are pivotally mounted to, the forward end 18*a* of running board 18 and the rearward end 24*b* of frame 24. A cross member 30*a* provides a brace extending laterally between struts 30 at approximately half way along the length of struts 30. An upper cylinder 32, which may for example be a pneumatic cylinder, is pivotally mounted at its rearward end up under running board 18, and is pivotally mounted at its forward end to cross member 28. A lower cylinder 34, which may for example also be a pneumatic cylinder, is pivotally mounted up under running board 18 at the rearward end 18*b* of running board 18. The lower end of lower cylinder 34 is pivotally mounted to either the struts 30 or to cross member 30*a*.

Upper cylinder 32 provides the scissor linkage actuator to collapse or extend the vertical height (dimension D) of scissor linkage 26 to thereby correspondingly raise or lower the forward end 24*a* of frame 24. This raises or lowers the forward end of track 20. Lower cylinder 34 provides the strut actuator to swing the struts 30 in direction E to raise or lower the rearward end 24*b* of frame 24 and thus to raise or lower the rearward end of track 20. Cylinders 32 and 34 thereby provide for selective and independent control by the operator, e.g. the driver of vehicle 10, of the height and orientation of track 20 above ground level F. The operator merely has to control the pressure in cylinders 32 and 34, or otherwise the position of the tracks as indicated by corresponding sensors (not shown).

In alternative embodiments, again without intending to be limiting, the scissor linkages could be replaced with linkage arms, for example in a parallelogram arrangement using a pair of arms. Further, the tracks could be positioned in board under the vehicle; for example in the cavities on either side of the drive shaft.

Advantageously, the cylinder pressures or track positions are displayed to the operator, for example digitally or by analog display, and a means to actively adjust the cylinder pressures or track position is provided to the operator. For example, a driver may be provided a joy-stick controller which, depending on the actuation of the joy-stick by the driver, controls extension or retraction of the cylinders. The cylinders may form part of a vehicle suspension system to coordinate the deployment of the retractable tracks 16 as part of balancing of the vehicle 10 to maximize traction and minimize and balance the vehicle's pressure footprint.

In the alternative embodiment of FIG. 2, not intended to be limiting, scissor linkages such as for example scissor linkages 26 and 26' are pivotally mounted at ends 24*a* and 24*b* of frame 24, it again being understood that a pair of such retractable tracks are mounted on both sides of vehicle 10. This differs from the embodiment of FIG. 1 in that instead of the use of a single scissor linkage for one end of frame 24 and the use of struts 30 for the opposite end of frame 24 as in FIG. 1, in FIG. 2 mirror image scissor linkages 26, 26' are used at ends 24*a*, 24*b* of frame 24 mounted up under the corresponding ends of running boards 18. Thus as seen in FIG. 2, selectively actuable actuators 32 and 32' are mounted under running boards 18, so as to criss-cross each other. Actuator 32' is mounted aft along running boards 18 and is pivotally coupled, so as to actuate, scissor linkages 26 at the forward end of frame 24. Actuator 32' is mounted up under the forward ends of running boards 18, pivotally coupled so as to actuate scissor linkages 26' at the rearward end of frame 24. A pivotally mounted strut 30, connecting the frame of vehicle 10 or running boards 18 to frame 24, may be employed on either side of vehicle 10 to stabilize and guide the vertical translation of track 20 during actuation of actuators 32, 32'. Reference to more than one running board 18, and associated actuators and scissor linkages, is a reference to running boards 18, actuators 32,32', and scissor linkages 26,26' on either side of vehicle 10.

In a further alternative embodiment the tracks or track 20 may be mounted under the vehicle, laterally inset from the sides of the vehicle, for example mounted along or under the longitudinally extending centerline of the vehicle.

In some embodiments the vehicle may have other than four wheels. For example, it is intended to be within the scope of the present disclosure that the vehicle may be for example a two or four wheeled trailer, for example for towing behind a four wheeled vehicle, such that one or more retractable tracks such as seen in FIGS. 1 and 2 are mounted under the trailer. In the case of a two wheeled trailer, one or a pair of retractable tracks such as described above may be mounted under the trailer, in front or behind the tires, or between the tires in the center of the trailer. In some embodiments the trailer may have drive axles to move itself.

What is claimed is:

1. A retractable driven track system for urging motion of a wheeled vehicle driven over soft terrain, the wheeled vehicle having a forward end and a rearward end, and an underside defined by at least the forward end and rearward end, the system comprising:

a frame adapted for operative coupling to the underside of the wheeled vehicle and, when operatively coupled to the underside of the wheeled vehicle, having a forward end corresponding to the forward end of the wheeled vehicle and a rearward end, longitudinally spaced from the forward end of the frame, and corresponding to a rearward end of the wheeled vehicle;

a flexible endless track mounted on the frame, between the forward end and rearward end of the frame, for rotation of the endless track along the underside of the wheeled vehicle;

first and second pivotable linkages each coupled at their respective lower ends to the forward end and rearward end of the frame, respectively, and adapted for coupling at their respective upper ends to the underside of the wheeled vehicle, a selectively actuable first actuator operatively coupled to the frame, and adapted to cooperate between the underside of the wheeled vehicle and the first pivotable linkage, when the first pivotable linkage and thereby the frame are coupled to the underside of the wheeled vehicle, to selectively lower and raise the forward end of the frame and thereby a forward end of the endless track, relative to the underside of the wheeled vehicle, to thereby engage and disengage, respectively, the forward end of the endless track with the soft terrain;

a selectively actuable second actuator operatively coupled to the frame, and adapted to cooperate between the underside of the wheeled vehicle and the second pivotable linkage, when the second pivotable linkage and thereby the frame are coupled to the underside of the wheeled vehicle, to selectively lower and raise the rearward end of the frame and thereby a rearward end of the endless track, relative to the underside of the wheeled vehicle, to thereby engage and disengage, respectively, the rearward end of the endless track with the soft terrain, wherein the first and second actuators are selectively and independently controllable relative to one another; and a drive cooperating with the endless track for rotation of the endless track relative to the frame.

2. The system of claim 1, wherein the first pivotable linkage includes a scissor linkage, coupled to the forward end of the frame and adapted for coupling to the underside of the wheeled vehicle, and wherein the second pivotable linkage includes a strut arrangement, coupled to the rearward end of the frame and adapted for coupling to the underside of the wheeled vehicle, and wherein, when the scissor linkage and the strut arrangement, and thereby the frame, are coupled to the underside of the wheeled vehicle, the first and second actuators cooperate between the underside of the wheeled vehicle and the scissor linkage and the strut arrangement, respectively, to expand and contract the scissor linkage and the strut arrangement so as to correspondingly lower and raise the forward end and rearward end of the frame.

3. The system of claim 1, wherein the wheeled vehicle is a four wheeled vehicle having a single wheel in each of the four corners of the wheeled vehicle so as to define a longitudinally extending wheelbase between front and rear wheels on each side of the wheeled vehicle, and wherein the frame, with the endless track, the linkage, the first and second actuators and the drive mounted thereon, is operatively coupled to the wheelbase on each side of the wheeled vehicle between corresponding front and rear wheels of the wheeled vehicle.

4. The system of claim 1, wherein the wheeled vehicle has front and rear wheels and sides defined between the front and rear wheels, and wherein the frame, with the endless track, the linkage, the first and second actuators and the drive mounted thereon, is operatively coupled to the sides between the front and rear wheels of the wheeled vehicle.

5. The system of claim 4, wherein the frame, when operatively coupled to the sides, lies substantially flush along the sides.

6. The system of claim 1, wherein the wheeled vehicle has at least one side defined between the forward and rearward ends of the wheeled vehicle, and wherein the frame, with the endless track, the linkage, the first and second actuators and the drive mounted thereon, is operatively coupled to the at least one side, and when so operatively coupled, the frame is located under the underside of the wheeled vehicle, laterally inset from the at least one side.

7. The system of claim 1, wherein when the frame, with the endless track, the linkage, the first and second actuators and the drive mounted thereon, is operatively coupled to the underside of the wheeled vehicle, the frame is located centrally under the underside of the wheeled vehicle.

8. The system of claim 1, wherein the first and second pivotable linkages include first and second scissor linkages, and wherein the first scissor linkage is coupled to the forward end of the frame and is adapted for coupling to the underside of the wheeled vehicle, and wherein the second scissor linkage is coupled to the rearward end of the frame and is adapted for coupling to the underside of the wheeled vehicle.

9. The system of claim 1, wherein the first and second actuators are first and second pneumatic cylinders.

10. A method of using the system of claim 1 for urging motion of a wheeled vehicle driven over soft terrain, wherein the method comprises the steps of:

coupling the system of claim 1 to the underside of the wheeled vehicle;

moving the wheeled vehicle while the system of claim 1 is tucked closely to the underside of the wheeled vehicle;

on encountering soft terrain, actuating the first and second actuators to lower the frame and the track relative to the underside of the wheeled vehicle;

selectively and independently controlling the forward and rearward ends of the frame and the track using the first and second actuators to engage the track with the soft terrain; and using the drive to urge at least forward motion of the wheeled vehicle when the track is driven by the drive and the track is engaged with the soft terrain.

* * * * *